United States Patent
Kleve et al.

(10) Patent No.: US 8,512,788 B2
(45) Date of Patent: Aug. 20, 2013

(54) MOLD CONTROL AND ODOR PREVENTION IN PRODUCTION OF PELLETIZED FEEDSTUFFS

(75) Inventors: Duane Marvin Kleve, Lawrenceville, GA (US); James Bernard Ryan, Wellingbouough (GB)

(73) Assignee: Anitox Corporation, Lawrenceville, GA (US)

( * ) Notice: Subject to any disclaimer, the term of this patent is extended or adjusted under 35 U.S.C. 154(b) by 1009 days.

(21) Appl. No.: 12/096,331

(22) PCT Filed: Sep. 28, 2007

(86) PCT No.: PCT/US2007/080001
§ 371 (c)(1),
(2), (4) Date: Jun. 5, 2008

(87) PCT Pub. No.: WO2009/041981
PCT Pub. Date: Apr. 2, 2009

(65) Prior Publication Data
US 2009/0263549 A1   Oct. 22, 2009

(51) Int. Cl.
*A23K 3/03* (2006.01)
(52) U.S. Cl.
USPC ........... 426/532; 426/331; 426/332; 426/335; 426/807

(58) Field of Classification Search
USPC .......................... 426/335, 532, 807, 331, 332
See application file for complete search history.

(56) References Cited

U.S. PATENT DOCUMENTS

| | | | | |
|---|---|---|---|---|
| 3,895,116 A | * | 7/1975 | Herting et al. | 514/557 |
| 4,223,045 A | | 9/1980 | Fink | |
| 5,547,987 A | * | 8/1996 | Bland et al. | 514/557 |
| 5,591,467 A | * | 1/1997 | Bland et al. | 426/2 |
| 6,183,794 B1 | | 2/2001 | Kaesler et al. | |
| 7,001,625 B2 | | 2/2006 | Van Dyck et al. | |
| 2004/0170729 A1 | * | 9/2004 | Antony et al. | 426/331 |
| 2005/0170052 A1 | * | 8/2005 | Pimentel | 426/321 |

FOREIGN PATENT DOCUMENTS

| | | | |
|---|---|---|---|
| EP | 1474996 A1 | * | 11/2004 |
| JP | 09142980 A | * | 6/1997 |
| WO | WO 98/24534 | | 6/1998 |
| WO | WO 2006096825 A2 | * | 9/2006 |

OTHER PUBLICATIONS

Jun. 25, 2008, PCT Written Opinion for PCT/US2007/080001.
Jun. 25, 2008, PCT ISR for PCT/US2007/080001.

* cited by examiner

*Primary Examiner* — Chhaya Sayala
(74) *Attorney, Agent, or Firm* — Neifeld IP Law

(57) ABSTRACT

A feedstuff and a method for inhibiting the growth of pathogens in pelleted animal feeds which increases the efficiency of the pelleting process without introducing bad odors into the feed due to butyric acid. Active ingredients include a mixture of butyrate, propionate and surfactants.

12 Claims, No Drawings ic acids.

MOLD CONTROL AND ODOR PREVENTION IN PRODUCTION OF PELLETIZED FEEDSTUFFS

CROSS-REFERENCE TO RELATED APPLICATIONS

This is a 371 national stage application of international application no. PCT/US2007/80001, filed Sep. 28, 2007, which is incorporated herein by reference.

BACKGROUND OF THE INVENTION

1. Field of the Invention

A chemical preservative and lubricant for processing animal feedstuffs into pelletized feed that enhances milling efficiency, inhibits fungi, bacteria, and mycotoxins from growing in finished products even if they have relatively high water content, and which does not release objectionable amounts of butyric acid into the air from the finished product.

2. Discussion of the Background

It is common practice to use fungicides in animal feedstuffs containing propionic acid or its sodium, calcium or ammonium salt in some form. Bland et al., U.S. Pat. No. 5,547,987, discloses a composition for inhibiting pathogen growth in animal feeds using a mixture of butyric acid and propionic acid, each acid partially or completed converted to one of its salt forms. n-Butyric acid has an objectionable smell and therefore is difficult to formulate into commercially acceptable products. Many salts of n-butyric acid are less malodorous than the free acid but are still objectionable to users and to livestock eating the treated feed. Prior to Bland et al., neither n-butyric acid nor its salts were considered to have practical utility as feed preservatives.

Huitson et al, U.S. Pat. No. 3,595,665, discloses a method for preventing mold growth in crops and animal feedstuffs during storage based on binary and ternary mixtures of lower carboxylic acids.

Herting et al, Cereal Chem. 51:382-388 (1974), reported that isobutyric acid is the most effective antifungal agent among the common $C_1$-$C_4$ acids and that mixtures such as propionic:n-butyric:water (25:25:50) and propionic:isobutyric:water (25:25:50) are more effective than the individual acids in water. It was found that activity depended on the amount of water in the mixture; surprisingly, the activity increased as the proportion of water was increased. However, the presence or absence of mold was determined visually which is too imprecise method to draw valid conclusions.

Skov et al, U.S. Pat. No. 4,183,953 added isobutyric acid to aqueous ammonium isobutyrate in order to lower the crystallization temperature, enabling the use of ammonium isobutyrate solutions in unheated areas in cold weather. The relative antifungal activities of ammonium isobutyrate alone vs. isobutyric acid/ammonium isobutyrate were not reported.

SUMMARY OF THE INVENTION

One object of the invention is to provide a method for inhibiting mold growth in animal feedstuffs comprising: a) applying to a feedstuff an effective growth-inhibiting amount of an aqueous mixture containing ammonium propionate and ammonium butyrate wherein the ratio of $C_3/C_4$ species in the mixture is from 80:20 to 70:30; 1.5 to 3.0 wt. % of a surfactant, optionally 0.1-1.0 wt % terpenes, and b) cooking to obtain a pelletized feed.

Another object is to provide a pelletized feedstuff obtained by a process comprising:
a) applying to a feedstuff an effective growth-inhibiting amount of an aqueous mixture containing ammonium propionate and ammonium butyrate wherein the ratio of $C_3/C_4$ species in the mixture is from 80:20 to 70:30; 1.5 to 3.0 wt. % of a surfactant;
optionally 0.1-1.0 wt % terpenes, and b) cooking to obtain a pelletized feed.

DETAILED DESCRIPTION OF THE PREFERRED EMBODIMENTS

The preservative composition of this invention contains a mixture of n-butyric acid and propionic acid, each partially or completely converted to the ammonium salt, which are conveniently obtained by adding anhydrous ammonia to an aqueous solution of the acids to form a buffered mixture at pH 7.0+−0.1, preferably 7.0+−0.2. Neutral pH is favored in order to reduce the corrosive properties and odors of the carboxylic acids.

The process of the invention is an improvement over known processes using an equal mixture of propionate and butyrate and about 0.5% of surfactant, in that it maintains moisture penetration of the pelletized feed but avoids the objectionable smell due to n-butyric acid. In known processes the product released enough n-butyric acid so that the smell of the feed interfered with commercial use of the process.

The present invention greatly reduces the problem of offensive smell in the finished product, while retaining the advantages of good gelatinization, pellet quality and low energy consumption during the pelleting process. The inventive process involves applying a composition comprising an n-butyrate/propionate mixture in a ratio of about 3:1, wherein 75-100 mol. % of the acid mixture is in the form of a salt; 10-50 wt. % water, about 2-3 wt. % surfactant, and from 0.1 to 1.0 wt % terpenes. Preferably, 80-90 mol. % of the acid mixture is in salt form, providing a buffered solution. Typical ratios of the $C_3/C_4$ species in the mixture are 80:20 to 70:30, preferably 75:25. The total quantity of each carboxylic acid in the mixture, calculated on a free acid basis, is between 35 and 15 wt. %, preferably 25-33 wt. %.

Propionic acid is commercially produced from petroleum products such as liquid phase oxidation of butane or carboxylation of ethylene. n-Butyric acid is produced by liquid phase oxidation of butane.

The two carboxylate salts can be prepared separately and combined, optionally with additional n-butyric acid and/or propionic acid if a buffered mixture is desired. Ammonium salts can be prepared by treating the free acid with water and ammonium hydroxide or anhydrous ammonia. It is produced by reaction of nitrogen from the air with hydrogen obtained from natural gas using a catalyst and pressure to produce anhydrous ammonia.

In actual commercial use of feed fungicides, the product is generally added to the animal feedstuff at some point where it can be conveniently mixed thoroughly into the feedstuff. The preferred means of addition is by a general purpose feed mixer where all ingredients in the feed are mixed together at one time. Another possible point of addition is in a screw conveyor by means of a spray nozzle while the feed is being carried along by the conveyor.

The present fungicide can be added as a liquid spray containing the n-butyrate/propionate mixture in water, or as a granular powder composed of 20-60% dry weight of the active ingredient mixture dispersed on inorganic substances such as vermiculite, verxite, silicon oxides, and absorbent clays. Organic materials such as ground corn cobs are also suitable carriers.

The present invention can be used to control the growth of the predominant types of microorganisms found in foodstuffs including *Aspergillus, Fusarium, Penicillium, Rhizopus, Mucor* and yeast. Representative foodstuffs include broiler starter, broiler grower, broiler finisher, layer feeds, breeder feeds, swine feeds of all types, cattle feeds of all types, horse feeds, pet foods, and specialty feeds such as shrimp, catfish, and eel feeds. These feeds are all specially formulated to give best results in the species of animal or fish being fed. They contain varying amounts of cereal grains, vegetable protein meals, animal protein meals, vitamins, minerals and special additives such as fungicides, antibiotics, drugs, etc. Sometimes fungicides are added to the cereal grains to protect the grains during storage prior to use.

Cereal grains—Examples include but are not limited to the following: corn, sorghum (milo), wheat, oat, rye, and barley. The preferred application rate for cereal grains is 0.05%-1.0 wt. % for liquid solutions and 0.1% to 2.0 wt. % for powder treatment.

Rendered animal by-products—Examples include but are not limited to the following: meat and bone meal, feather meal, poultry viscera meal, fish meal, and blood meal. The preferred application rate for rendered animal products is 0.1-1.0 wt. % for liquid solutions and 0.1-2.0 wt. % for powder treatment.

Vegetable protein meals—Examples include but are not limited to the following: soybean meal, rapeseed meal, cottonseed meal and sunflower seed meal. The preferred application rate for vegetable protein meals is 0.05%-1.0 wt. % for liquid solutions and 0.1% to 2.0 wt. % for powder treatment.

Silage—Examples include but are not limited to the following: corn silage, wheat silage, sorghum silage, hay silage, and other grass silages. Preferred application rates vary from 0.05-1.0 wt. % for liquid solutions and 0.1-1.0 wt. % for powder treatment.

Finished feeds—Examples include but are not limited to the following: poultry starter feed, poultry grower feed, poultry layer feed, and poultry breeder feed. The preferred application rates for finished feed is 0.05-1.0 wt. % for liquid solutions and 0.1-1.0 wt. % for powder treatment.

Similar grades of swine feed, beef cattle feed, dairy cattle feed, horse feed, aquaculture feed, and pet feed are generally treated with 0.05-1.0 wt. % of liquid solutions and 0.1-1.0 wt. % of powder fungicide.

Surfactants—Suitable surfactants include but are not limited to anionic, cationic and non-ionic types, the latter being preferred; examples include Polysorbate-80, Polysorbate-60, Polysorbate-20 and Triton X100.

The composition of the invention is applied to feedstuffs in amounts from 1-10 wt %, preferably 1-2 wt. %. The feed is processed at a rate of 12-20 tons/h, preferably 16-18 tons/h, at a temperature from 165-200° F. The preferred processing temperature is from 178-195° F.

EXAMPLE 1

73.15% Ammonium Propionate
24.32% Ammonium Butyrate
2.24% Polysorbate 80 Surfactant
0.29% Natural Terpenes (citrus origin)

The ammonium propionate begins as an approximately 100 wt % concentrated propionic acid solution, which is buffered to a pH of 6.9 to 7.1 using anhydrous ammonia and water resulting in a final concentration of approximately 60 wt %. This reaction is completed at a temperature of 150° F. or less under ambient pressure. The ammonium butyrate begins as an approximately 100 wt % concentrated butyric acid solution, which is buffered to a pH of 6.9 to 7.1 using anhydrous ammonia and water resulting in a final concentration of approximately 60 wt %. This reaction is completed at a temperature of 150° F. or less under ambient pressure. The four components are blended together under ambient temperature and pressure to produce the antifungal solution.

EXAMPLE 2

Measurement of Butyric Acid Vapors Released from Treated Feed

1) Feed is treated with the composition of Example 1 at a 90:10 ratio

2) After treatment, three replicates of the product are transferred into sealable glass jars with screw cap lids.

3) The solid lid of the jar is modified to have two ports: One port to serve as an air inlet and the second port to serve as the exhaust port.

4) On the exhaust side, a Teflon tube is attached that connects to a water trap. The object is to pull air through the feed or through top or the jar and then trap the organic acid vapours in the water trap. One could use a vacuum to pull the air through the feed or an air line to force the air through. Either way the results are the same. The air flow and temperature should be regulated (usually 1 litre/minute at 50-120° F.

5) After one hour, the water trap is removed and the amount of propionic acid/butyric acid trapped in the water is measured. Based on the volume of water in the trap, the amount of air pulled through the trap and the concentration of the acids in the water, the parts per million (ppm) of each acid released in the air can be calculated.

CONCLUSION

The level of n-butyric acid released into the air from feed treated with according to the invention is below 200 ppm; preferably below 100 ppm, especially below 10 ppm.

Numerous modifications of the present invention are possible in light of these teachings. It is, therefore, to be understood that within the scope of the appended claims, the invention may be practiced otherwise than as specifically described herein.

The invention claimed is:

1. A method for inhibiting mold growth in animal feedstuffs comprising:
   a) applying to a feedstuff an effective growth-inhibiting amount of an aqueous mixture containing ammonium propionate and ammonium butyrate wherein the ratio of $C_3/C_4$ species in the mixture is from 80:20 to 70:30; 0.1-1.0 wt % terpenes, and 2.0 to 3.0 wt. % of a surfactant,
   b) cooking to obtain a pelletized feed,
wherein the treated feed release less than 10 ppm of butyric acid into the air.

2. The method of claim 1, wherein the feedstuff is selected from the group consisting of cereal grains, vegetable protein meals, rendered animal by-products, silage and finished feeds.

3. The method of claim 1, wherein the ratio of $C_3/C_4$ species in the mixture is about 3:1.

4. The method of claim 1, wherein the mixture comprises about 0.5 wt % terpenes.

5. The method of claim 1, wherein the pH of the mixture is 6.9 to 7.1.

6. The method of claim 1, wherein the aqueous mixture contains Polysorbate-80 as the surfactant, in at least 2.24 wt % concentration.

7. The method of claim 1, wherein the feedstuff is selected from the group consisting of cereal grains, vegetable protein meals, rendered animal by-products, silage and finished feeds.

8. A pelletized feedstuff obtained by a process comprising:
   a) applying to a starting feedstuff an effective growth-inhibiting amount of an aqueous mixture containing ammonium propionate and ammonium butyrate wherein the ratio of $C_3/C_4$ species in the mixture is from 80:20 to 70:30; 2.0 to 3.0 wt. % of a surfactant, 0.1-1.0 wt % terpenes; and
   b) cooking to obtain a pelletized feed,
wherein the treated feed release less than 10 ppm of butyric acid into the air.

9. The pelletized feedstuff of claim 8, wherein the ratio of $C_3/C_4$ species in the mixture is about 3:1.

10. The pelletized feedstuff of claim 8, wherein the mixture comprises about 0.5 wt % terpenes.

11. The pelletized feedstuff of claim 8, wherein the pH of the mixture is 6.9 to 7.1.

12. The pelletized feedstuff of claim 8, wherein the aqueous mixture contains Polysorbate-80 as the surfactant, in at least 2.24 wt % concentration.

\* \* \* \* \*